UNITED STATES PATENT OFFICE.

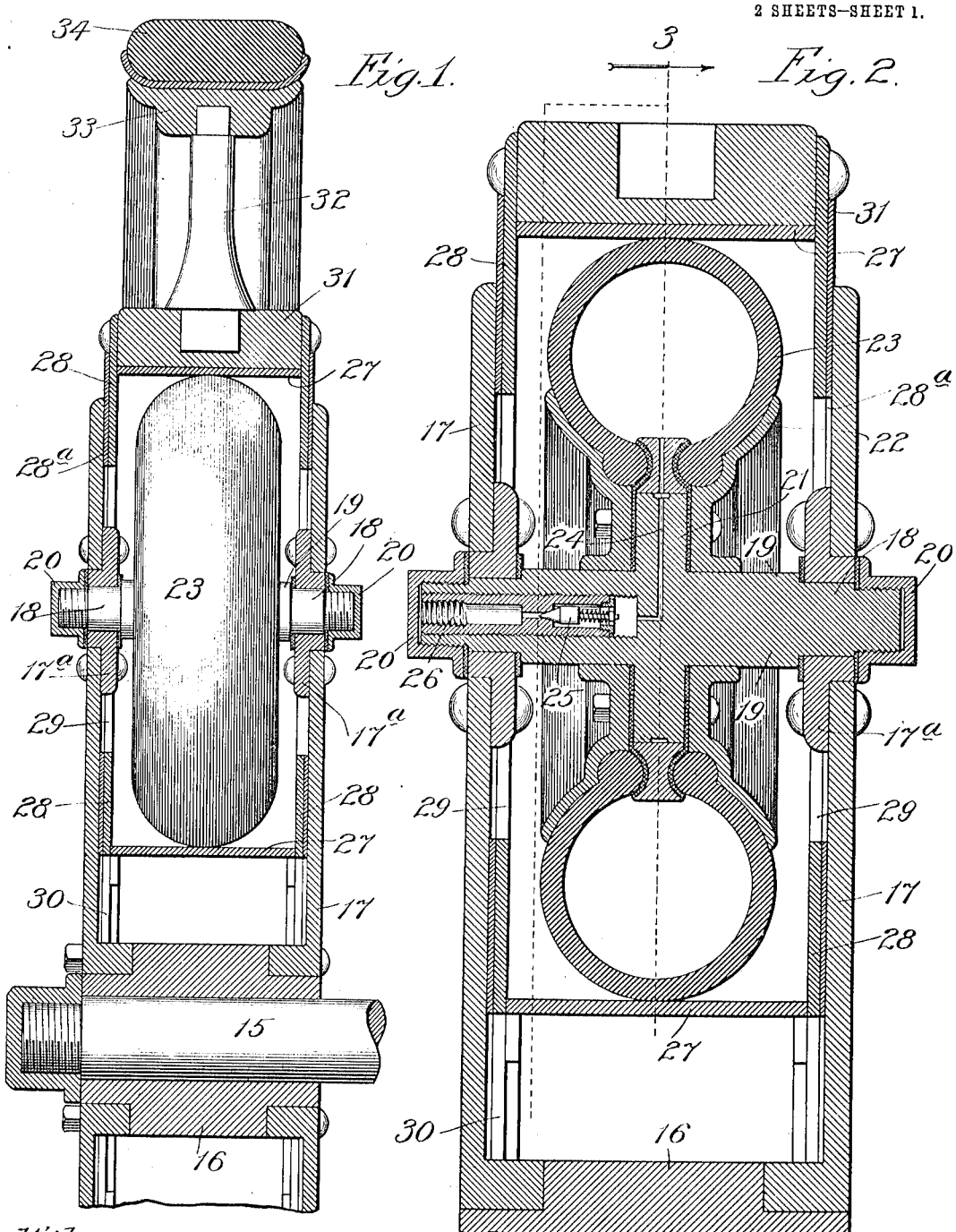

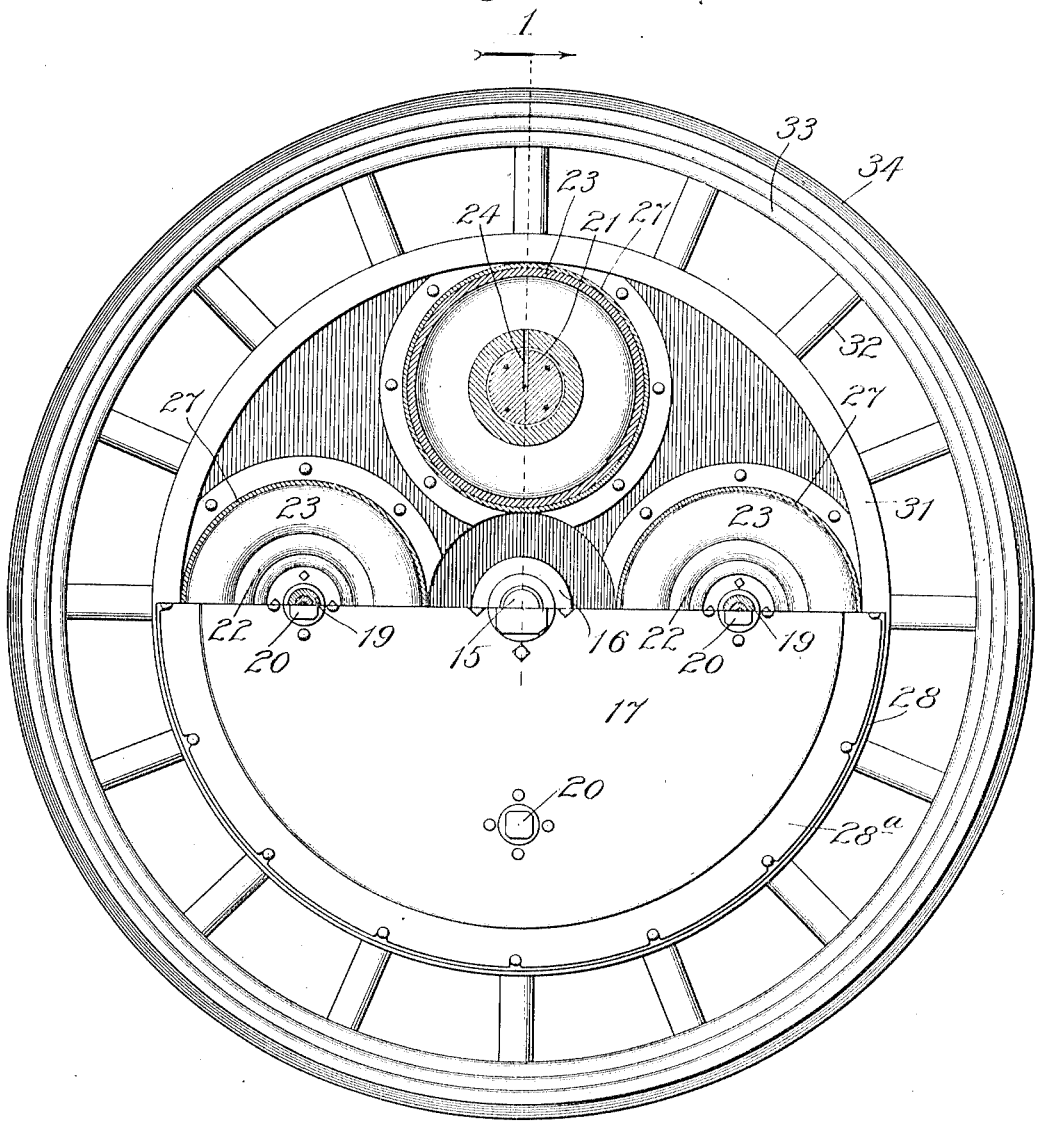

JOHN F. MITCHELL, OF TOPEKA, KANSAS.

VEHICLE-WHEEL.

1,073,697.

Specification of Letters Patent.   Patented Sept. 23, 1913.

Application filed September 26, 1907. Serial No. 394,704.

*To all whom it may concern:*

Be it known that I, JOHN F. MITCHELL, a citizen of the United States, residing at Topeka, in the county of Shawnee, State of Kansas, have invented certain new and useful Improvements in Vehicle-Wheels, of which the following is a specification.

My invention is a cushioned wheel for vehicles.

More particularly, it consists of two relatively movable members with a set of cushions between them, one member carrying the wheel rim and the other member being closely fitted on the axle shaft.

The object of my invention is to provide a cushioned vehicle wheel in which the cushion shall be protected from undue wear and shall be highly effective to guard against jars and sudden impacts.

Referring to the drawings—Figure 1 is an axial section of my improved vehicle wheel, taken on the line 1 of Fig. 3. Fig. 2 is a section on an enlarged scale of one of the cushions and its immediately related parts, also taken on the line 1 in Fig. 3. Fig. 3 is an elevation of the wheel, partly in section, as indicated by the lines 3 in Fig. 2.

On the axle shaft 15 is a hub 16 to which are bolted the two parallel plates 17. These plates carry several shafts 18 arranged regularly around the axle shaft 15. Each shaft 18 has opposed shoulders 19 at each end thereof, together with opposed clamping nuts 20, by means of which it is held in fixed relation to the plates 17. On each of the shafts 18 is a disk-like extension 21 to which is attached a circular channel 22, to receive the ring-shaped pneumatic cushion 23. An air supply duct 24 extends from the center of the shaft 18 to the interior of the pneumatic cushion 23. At its termination at the center of said shaft is a check valve 25 and beyond this is a threaded seat to which a source of compressed air may be attached. This is covered by the clamping nut 20 already referred to.

The structure described thus far extends out substantially rigidly from the wheel hub 16 and constitutes a framework substantially in the plane of the vehicle wheel.

Around each of the pneumatic cushions 23 is a cylindrical chamber wall 27 with flat end walls 28 cut away, as shown by the reference numeral 29. The flat end wall 28 is common to the several cylindrical chambers and is also cut away as indicated by the reference numeral 30. These two plates 28 lie within the plates 17, and a certain amount of relative sliding movement is possible. The said plates 28 are clamped together on the cylindrical rim 31 from which the short spokes 32 radiate and carry the wheel rim 33 with the tire 34. The plates 28 with the rims 31 and 33 constitute another framework substantially in the plane of the wheel.

Any displacement of one of the two frameworks that have been mentioned relatively to the other will crowd each of the pneumatic cushions 23 against its respective cylinder wall 27. The pressure between these two members 23 and 27 will always be normal to the contacting surface between them and thus forces tending to stretch or permanently distort the pneumatic cushion 23 are avoided. The weight of the vehicle acting through the shaft 15 will be evenly distributed to the several shafts 18, and thence through the several pneumatic cushions 23 to respective cylinder walls 27, and thence to the wheel rim 33. If the shaft 15 is a driving shaft, as of an automobile, the torque will be communicated to the wheel rim equally through the several cushions 23, and in this case the force between each cushion 23 and its respective cylinder wall 27 will be normal to their junction surface. Any sudden displacement of the wheel rim 33, as by the vehicle running over a stone, will crowd the several cylinder walls 27 equally against the pneumatic cushions 23, which, having their supports 22 held by the inertia of the vehicle, will yield to the said displacement. These pneumatic cushions are all inclosed within a chamber that protects them from accidental injury. This chamber is formed by the side plates 17 of the frame which extends out from the wheel hub 16, and by the side plates 28 which are rigidly attached to the wheel rim. The pneumatic cushions 23 are not subjected to any abrasion or other wearing action, for as has been already pointed out they are acted upon only by forces normal to the surface.

When it is desired to replenish the supply of compressed air in the pneumatic cushions 23, the clamping nut 20 may be unscrewed and an air pump attached to the threaded socket 26. The check valve 25 will hold the air within the pneumatic cushions 23.

I claim:

1. A vehicle wheel comprising a wheel hub with annular shoulders at the ends thereof, two circular sheet metal plates having holes at their centers fitting upon said annular shoulders and bolted to the said hub, a circumferential series of cross shafts having shoulders at their ends abutting against the edges of corresponding holes in said plates, nuts on the ends of said shafts clamping the plates against the shoulders thereon, seats for pneumatic cushions surrounding and borne by the respective shafts, annular pneumatic cushions in said seats, a wheel rim, plates extending therefrom between the first-mentioned plates and respectively adjacent thereto, and cylindrical shells surrounding the said pneumatic cushions and having their ends supported by said wheel rim plates, said wheel rim plates being cut away around the respective shafts so as to permit relative movement between the pairs of plates.

2. A vehicle wheel comprising a hub, a pair of circular spaced plates mounted centrally on the hub, a circumferential series of cross shafts having their ends supported by said plates, each cross shaft having a flange integral therewith extending all around it at an intermediate point, two plates with diverging rims bolted to the respective sides of said flange, the rims forming a seat for a pneumatic cushion, pneumatic cushions in the said seats formed around the respective cross shafts, a wheel rim, a pair of annular plates projecting inwardly from said wheel rim between the first-mentioned plates and respectively adjacent thereto, and cylindrical shells having their ends supported by the wheel rim plates and surrounding the said pneumatic cushions, the said wheel rim plates being cut away around the said shafts.

JOHN F. MITCHELL.

Witnesses:
WM. W. BOLLARD,
G. W. MILLER.